(12) United States Patent
Sakai

(10) Patent No.: US 12,530,735 B2
(45) Date of Patent: Jan. 20, 2026

(54) IMAGE PROCESSING APPARATUS THAT IMPROVES COMPRESSION EFFICIENCY OF IMAGE DATA, METHOD OF CONTROLLING SAME, AND STORAGE MEDIUM

(71) Applicant: CANON KABUSHIKI KAISHA, Tokyo (JP)

(72) Inventor: Hiroyuki Sakai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 398 days.

(21) Appl. No.: 18/155,952

(22) Filed: Jan. 18, 2023

(65) Prior Publication Data

US 2023/0245270 A1    Aug. 3, 2023

(30) Foreign Application Priority Data

Jan. 31, 2022    (JP) ................................. 2022-013253

(51) Int. Cl.
| | | |
|---|---|---|
| *G06T 3/4015* | (2024.01) | |
| *G06T 7/13* | (2017.01) | |
| *G06T 7/90* | (2017.01) | |
| *G06T 9/00* | (2006.01) | |
| *G06V 30/10* | (2022.01) | |

(52) U.S. Cl.
CPC ............. *G06T 3/4015* (2013.01); *G06T 7/13* (2017.01); *G06T 7/90* (2017.01); *G06T 9/00* (2013.01); *G06V 30/10* (2022.01); *G06T 2207/10008* (2013.01)

(58) Field of Classification Search
CPC .. G06T 3/4015; G06T 7/13; G06T 7/90; G06T 9/00; G06T 2207/10008; G06V 30/10
See application file for complete search history.

(56) References Cited

U.S. PATENT DOCUMENTS

| | | | |
|---|---|---|---|
| 11,967,118 B1 * | 4/2024 | Brown ...................... | G06T 3/40 |
| 2016/0155244 A1 * | 6/2016 | Kakuta ..................... | G06T 5/94 |
| | | | 382/162 |
| 2021/0192695 A1 * | 6/2021 | Kosaka ..................... | G06T 7/90 |
| 2022/0284631 A1 * | 9/2022 | Matsuoka ............. | H04N 19/117 |

FOREIGN PATENT DOCUMENTS

| | | | | |
|---|---|---|---|---|
| JP | 2003309727 A | * | 10/2003 | ............... H04N 1/41 |
| JP | 3890250 B2 | | 3/2007 | |
| JP | 2013084071 A | * | 5/2013 | |
| JP | 2013102300 A | | 5/2013 | |

* cited by examiner

*Primary Examiner* — Vu Le
*Assistant Examiner* — Rachel Anne Ometz
(74) *Attorney, Agent, or Firm* — ROSSI, KIMMS & McDOWELL LLP

(57) ABSTRACT

An image processing apparatus that makes it possible to reproduce image information without omission and improves the compression efficiency of image data. Character pixels are detected from an image generated by reading an original using a scanner. Color information for use in compressing image data is determined. A color-converted image image is generated on which colors of the detected character pixels are corrected based on the color information, without changing colors of pixels other than the colors of the detected character pixels. The color-converted image is divided into images of respective colors of the color information. Compressed data of binary images is generated from the divided images of the respective colors.

11 Claims, 14 Drawing Sheets

310 CHARACTER PIXEL COLOR-CONVERTED IMAGE

| COLOR | START COORDINATES | END COORDINATES | NUMBER OF PIXELS |
|---|---|---|---|
| WHITE | (X1,Y1) | (X2,Y2) | 1000 |
| BLACK | (X3,Y3) | (X4,Y4) | 400 |
| RED | (X5,Y5) | (X6,Y6) | 300 |
| GRAY | (X7,Y7) | (X8,Y8) | 500 |

312 COLOR INFORMATION

| COLOR | START COORDINATES | END COORDINATES | NUMBER OF PIXELS |
|---|---|---|---|
| WHITE | (X1,Y1) | (X2,Y2) | 1000 |
| GRAY | (X7,Y7) | (X8,Y8) | 500 |
| BLACK | (X3,Y3) | (X4,Y4) | 400 |
| RED | (X5,Y5) | (X6,Y6) | 300 |

314 SORTED COLOR INFORMATION

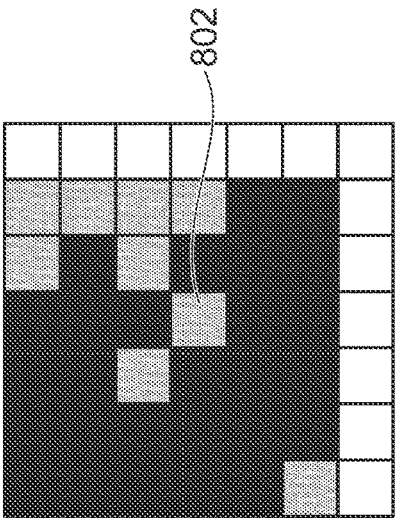
FIG. 8A
FIG. 8B
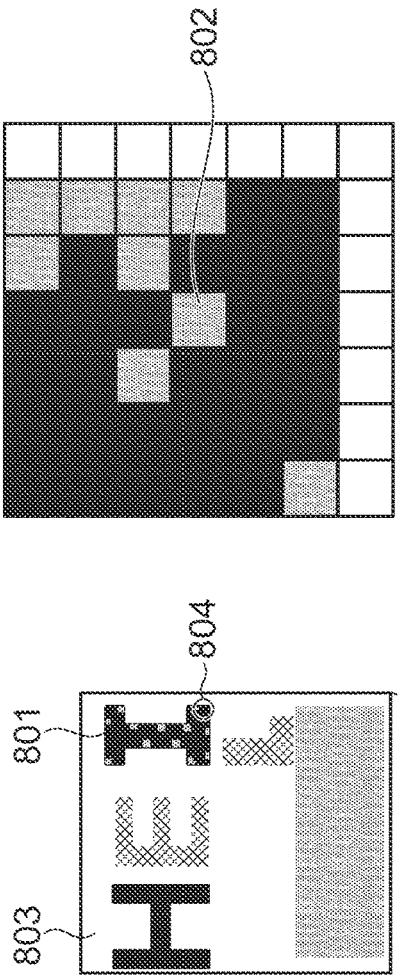
FIG. 8C
FIG. 8D
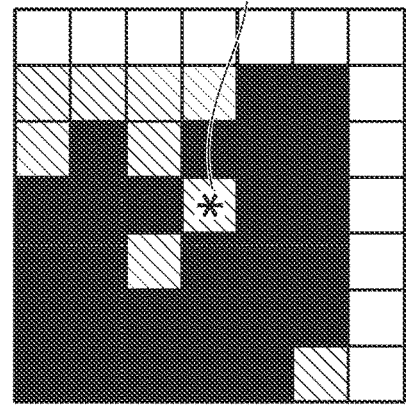
FIG. 8E

✱ : TARGET PIXEL

▧ : BLACK CHARACTER CANDIDATE PIXEL

☐ : NON-BLACK CHARACTER CANDIDATE PIXEL

IMAGE PROCESSING APPARATUS THAT IMPROVES COMPRESSION EFFICIENCY OF IMAGE DATA, METHOD OF CONTROLLING SAME, AND STORAGE MEDIUM

BACKGROUND OF THE INVENTION

Field of the Invention

The present invention relates to an image processing apparatus, a method of controlling the same, and a storage medium, and more particularly to a technique for efficiently compressing image data.

Description of the Related Art

The wide-spread use of a color printer and a color scanner has increased the opportunity of using a color document printed with many colors, which increases the opportunity of reading a color document using a scanner, storing the read image data as an electronic file of a color image, and transmitting the image data e.g. via the Internet. However, the image data of a color image (hereinafter referred to as the "color image data") is generally large in data size, and hence the remaining storage area of a storage device is much reduced when the color image data is stored, and further, a communication load when transmitting the color image data is large.

To cope with this, as a method of compressing color image data, there is used any of a method of compressing data by converting the data to a binary image having pseudo halftone using e.g. an error diffusion method, a method of compressing data using the JPEG method, a method of performing ZIP compression or LZW compression by converting color image data to pallet colors of e.g. eight bits, and so forth.

Further, as a method having high compression efficiency, Japanese Patent No. 3890250 discloses a technique of performing color reduction processing on a color image to acquire color information and an index color image, and generating a binary image of each color and background color information, to thereby perform compression processing using e.g. the Modified Modified Read (MMR) compression method. Further, Japanese Laid-Open Patent Publication (Kokai) No. 2013-102300 discloses an image encoding method in which a hue circle is divided according to a predetermined criterion, and colors of an original are reduced according to degrees of distribution of colors of pixels in the image, in the divided areas of the hue circle.

In a case where e.g. a handwritten document having uneven density is read by a scanner, variation in the luminance values of pixels is liable to occur. When compression processing is performed on image data having variation in the luminance values by applying the technique described in the above-mentioned Japanese Patent No. 3890250, binary images of a plurality of colors, such as black and gray, are generated with respect to each character. At this time, in the MMR compression method, as the continuity of pixels is higher, the compression efficiency is more improved, and hence if the luminance values of pixels forming a character have variation, causing a lowered continuity, the compression efficiency is lowered.

Further, in a case where a plurality of colors, such as black and gray, are determined as approximate colors and integrated using the technique described in the above-mentioned Japanese Laid-Open Patent Publication (Kokai) No. 2013-102300, for example, a gray object is filled with black, thereby causing omission of image information.

SUMMARY OF THE INVENTION

The present invention provides an image processing apparatus that makes it possible to reproduce image information without omission and improves the compression efficiency of image data, a method of controlling the same, and a storage medium.

In a first aspect of the present invention, there is provided an image processing apparatus including a detection unit configured to detect character pixels from an image generated by reading an original using a scanner, a determination unit configured to determine color information for use in compressing image data, a color conversion unit configured to generate a color-converted image in which colors of the character pixels detected by the detection unit are corrected based on the color information, without changing colors of pixels other than the colors of the character pixels detected by the detection unit, a division unit configured to divide the color-converted image into images of respective colors of the color information, and a compression unit configured to generate compressed data of binary images from the images of the respective colors generated by the division unit.

In a second aspect of the present invention, there is provided a method of controlling an image processing apparatus, including detecting character pixels from an image generated by reading an original using a scanner, determining color information for use in compressing image data, generating a color-converted image in which colors of the detected character pixels are corrected based on the color information, without changing colors of pixels other than the colors of the detected character pixels, dividing the color-converted image into images of respective colors of the color information, and generating compressed data of binary images from the divided images of the respective colors.

According to the present invention, it is possible to reproduce image information without omission and improve the compression efficiency of image data.

Further features of the present invention will become apparent from the following description of exemplary embodiments (with reference to the attached drawings).

BRIEF DESCRIPTION OF THE DRAWINGS

FIG. 8A is a view of an example of a 2-bit image obtained as a result of processing up to a processing step executed by a color reduction processor.

FIG. 8B is an enlarged view of an area of part of a handwritten character in the reduced-color image.

FIG. 8C is a diagram showing an example of the representative color information.

FIG. 8D is a diagram showing an example of the variance value table.

FIG. 8E is a view of an example of a result of edge detection performed on pixels appearing in FIG. 8B.

DESCRIPTION OF THE EMBODIMENTS

The present invention will now be described in detail below with reference to the accompanying drawings showing embodiments thereof.

Figure 1:
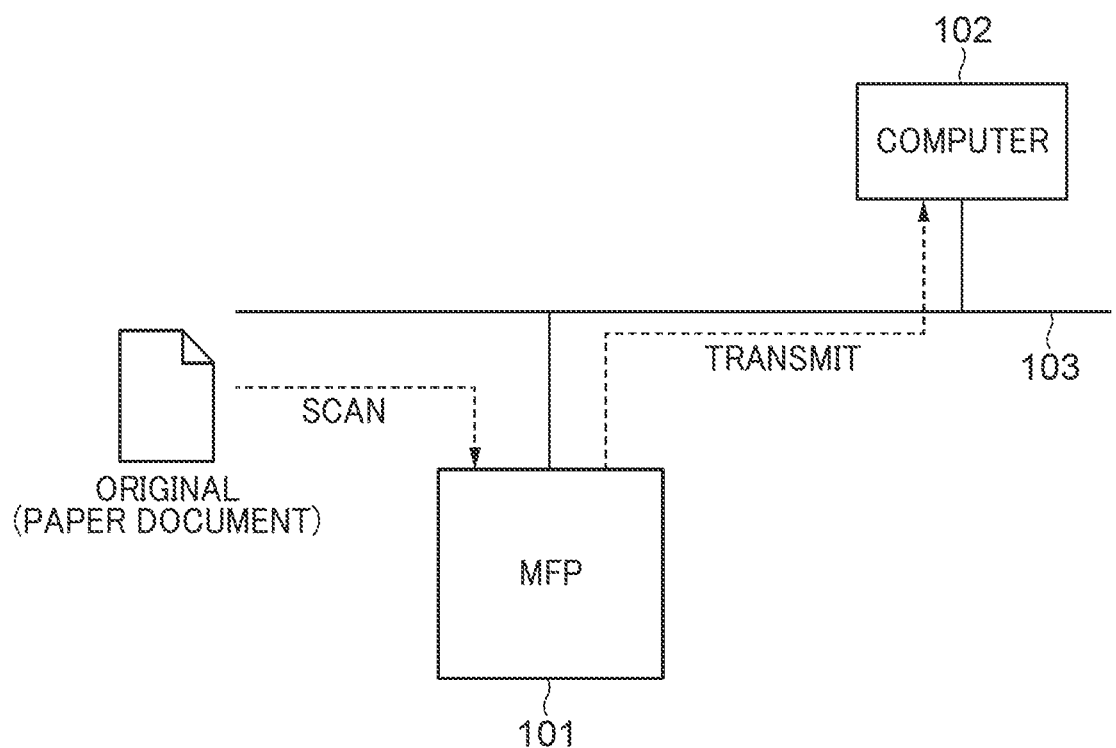
FIG. 1 is a schematic configuration diagram of an image processing system including an image processing apparatus (MFP) according to embodiments.

FIG. 1 is a schematic configuration diagram of an image processing system including an image processing apparatus (MFP) according to embodiments. The image processing system is formed by communicably connecting a multifunction peripheral (MFP) 100 as an example of the image processing apparatus and a personal computer (PC) 102 as an example of an information processing apparatus via a network 103.

A user can make settings of a destination (such as the PC 102) to which a scanned image is to be transmitted and settings of scanning and transmission, by operating a console section 203 (see FIG. 2) of the MFP 101. More specifically, the user can set a resolution and a compression ratio of a scanned image to be generated, a data format (such as JPEG, TIFF, PDF, or color reduction compression), and the like. In the present embodiment, the description is given assuming that the color reduction compression is specified as the data format unless otherwise specified. Note that the technical details of the color reduction compression will be described hereinafter.

The user can use software functions and hardware functions of the MFP 101 to thereby cause a scanner section 201 to scan an original (paper document), generate image data of the generated scanned image according to the specified settings, and transmit the image data to a designated destination. Here, the scanned image data generated by the MFP 101 is assumed to be transmitted to the PC 102 in a file format, such as the PDF, and therefore, the image can be viewed on the PC 102 by using a general-purpose viewer installed in the PC 102.

Figure 2:
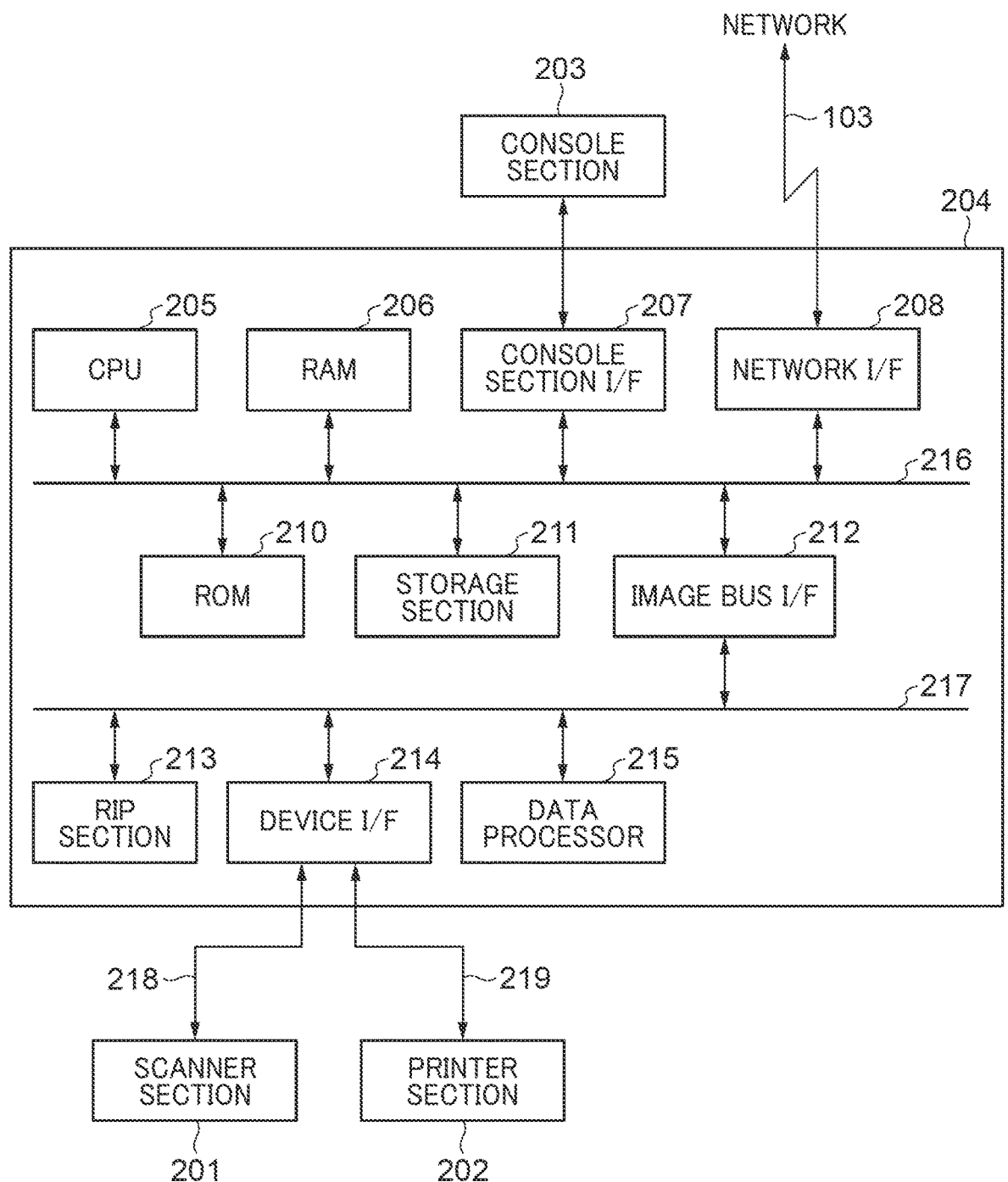
FIG. 2 is a schematic block diagram of the MFP.

FIG. 2 is a schematic block diagram of the MFP 101. The MFP 101 includes the scanner section 201 which is an image input device, a printer section 202 which is an image output device, a control unit 204, and the console section 203 which is a user interface. The control unit 204 is connected to the scanner section 201, the printer section 202, and the console section 203. Further, the control unit 204 is connected to the network 103, and performs inputting and outputting image information and device information from and to an external apparatus via the network 103.

The control unit 204 includes a CPU 205, a RAM 206, a ROM 210, a storage section 211, a console section interface 207, and a network interface 208, which are connected to a system bus 216. Further, the control unit 204 includes a raster image processor (RIP) section 213, a device interface 214, and a data processor 215, which are connected to an image bus 217. The control unit 204 includes an image bus interface 212 which is a bus bridge that connects between the system bus 216 and the image bus 217 and converts a data structure.

The CPU 205 is control means (processor) for controlling the overall operation of the MFP 101. The RAM 206 is a system work memory for the operation of the CPU 205 and is also used as an image memory for temporarily storing image data. The ROM 210 is a boot ROM and stores programs including a boot program for starting up the MFP 101. The storage section 211 is a hard disk drive (HDD) or the like and stores system control software and image data.

The console section interface 207 is for communicably connecting between the console section 203 and the CPU 205, and outputs image data to be displayed on the console section 203 to the console section 203. Further, the console section interface 207 notifies the CPU 205 of input information based on a user's operation on the console section 203. The network interface 208 is for connecting the MFP 101 to the network 103 and enabling the MFP 101 to input and output information in the form of a packet.

The image bus 217 is implemented e.g. by a PCI bus or an IEEE 1394 bus so as to enable high-speed transfer of image data. The RIP section 213 executes processing for analyzing a page description language (PDL) code and expanding data into a bit map image of a specified resolution (so-called rendering processing). The device interface 214 is connected to the scanner section 201 via a signal line 218 and to the printer section 202 via a signal line 219 to enable the CPU 205 to control the scanner section 201 and the printer section 202. The printer section 202 receives image data subjected to expansion processing via the device interface 214 and performs printing.

The data processor 215 performs image processing on scanned image data input from the scanner section 201, processing for converting data for printing to data which can be printed by the printer section 202, OCR processing, and so forth. Further, the data processor 215 generates compressed data 322 (see FIG. 3A) by performing color reduction compression processing. The generated compressed data 322 is transmitted to a designated destination (such as the PC 102) via the network interface 208 and the network 103. Further, the data processor 215 performs processing for expanding the compressed data 322 received via the network interface 208 and the network 103.

Figure 3A:
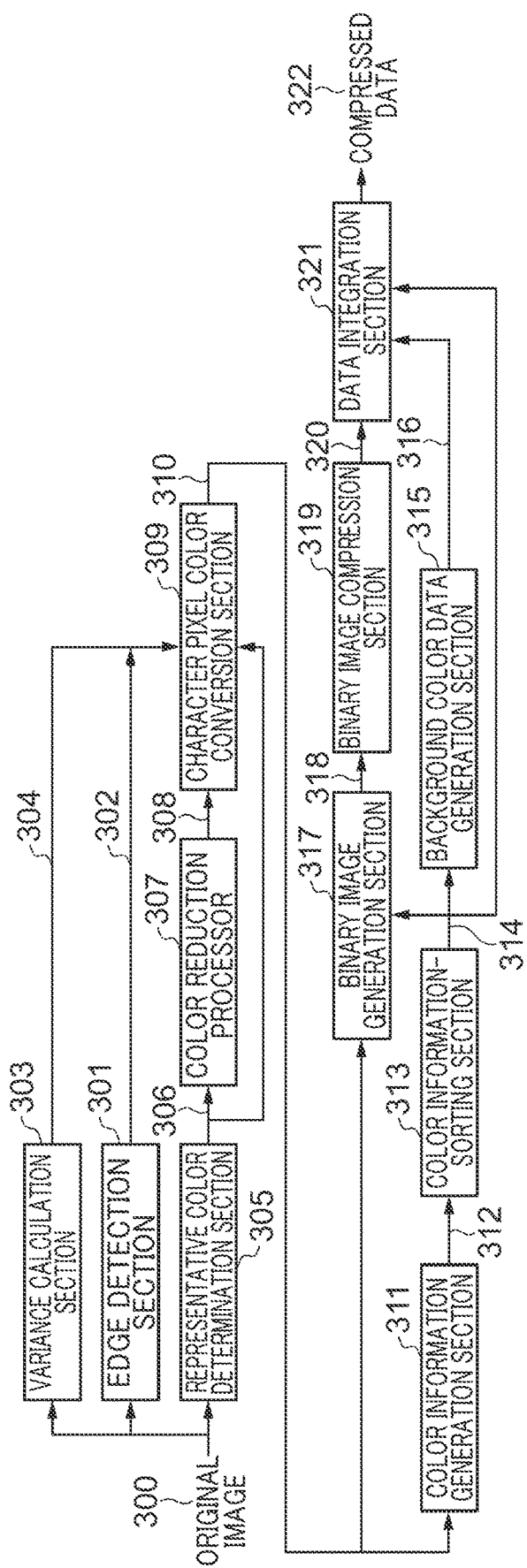
FIG. 3A is a schematic block diagram of a data processor included in the MFP.

FIG. 3A is a schematic block diagram of the data processor 215 included in the MFP 101. The data processor 215 includes an edge detection section 301, a variance calculation section 303, a representative color determination section 305, a color reduction processor 307, a character pixel color conversion section 309, a color information generation section 311, and a color information-sorting section 313. Further, the data processor 215 includes a background color data generation section 315, a binary image generation section 317, a binary image compression section 319, and a data integration section 321.

Note that in the present embodiment, the hardware and the software of the data processor 215 cooperate to exhibit the functions of the above-described components, and the data processor 215 is implemented as a microcomputer dedicated to scanned image data processing. However, this is not limitative, but the CPU 205 may be configured to function as the data processor by executing a predetermined program stored in the storage section 211.

Figure 3E:
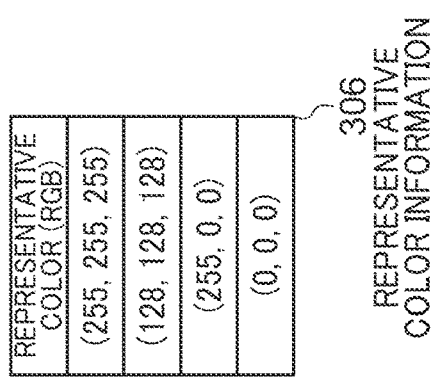
FIG. 3E is a diagram showing an example of representative color information.

First, an original image input to the data processor 215 will be described. FIG. 3B is a view of an example of an original image 300. In an upper portion, "H" in black, "E" in read, and "I" as a whole in black with color unevenness expressed by gray dots are drawn from the left in the mentioned order. On the right side in a middle portion "L" is drawn in pink. In a lower portion, a gray rectangle is drawn.

Note that the color unevenness in "I" can be generated by reducing the color to an intermediate color between the color of "I" (black) and the color of the background (white). Further, in the present embodiment, it is assumed that "H", "E", "I", and "L" are recognized as characters by the character pixel color conversion section 309 (described hereinafter in detail) and are not recognized as figures, whereas the gray rectangle is recognized as a figure. Note that in FIG. 3B, the characters drawn in red and pink are expressed by respective predetermined types of hatching for the convenience of illustration.

The edge detection section 301 detects edge information of each pixel of the original image 300, and more specifically, detects two types of edges different in strength. Note that details of the edge detection method will be described hereinafter. An edge detection signal 302 associated with each pixel of the original image 300 is generated by an edge detection process. The edge detection signals 302 form e.g. a 2-bit image having the same size as the original image 300.

Figures 3C, 3D:
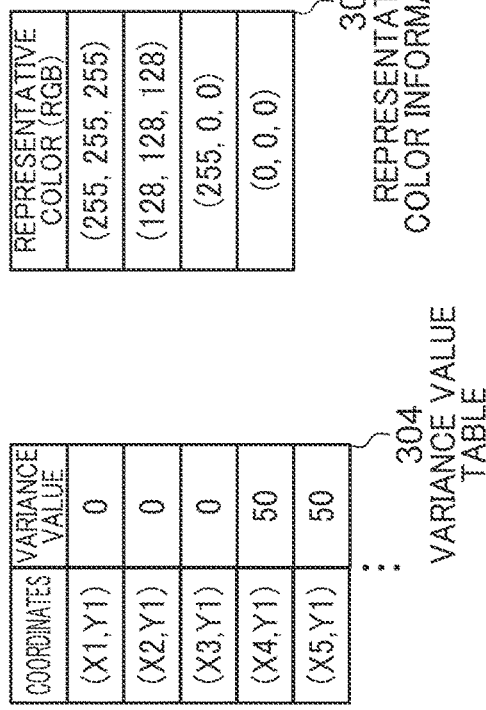
FIG. 3C is a view of an example of a 2-bit image formed by edge detection signals generated from the original image by an edge detection section.
FIG. 3D is a diagram showing a variance value table indicating variances of pixels of the original image.
Figure 3B:
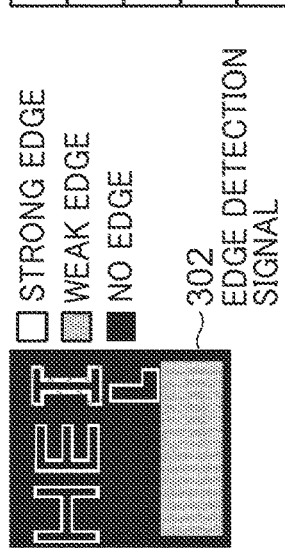
FIG. 3B is a view of an example of an original image.

FIG. 3C is a diagram showing an example of a 2-bit image formed by the edge detection signals 302 generated from the original image 300 by the edge detection section 301. Here, each edge detection signal 302 takes one of values of 0, 1, and 2 according to an edge detection result of each pixel of the original image 300, and "0", "1", and "2" indicate no edge, a weak edge, and a strong edge, respectively.

The variance calculation section 303 divides the original image 300 into areas each having e.g. 3 pixels in a vertical direction×3 pixels in a lateral direction, calculates variance of luminance values of the pixels in each area, and sets the calculated variance as the variance of the center pixel of the area. With this, as shown in FIG. 3D, a variance value table 304 indicating the variance of each pixel indicated by (X, Y) coordinates of the original image 300 is generated.

The representative color determination section 305 determines representative color information as information on colors to which original colors are to be reduced and as information required to perform color reduction processing on the original image 300 for reducing the original colors into a predetermined number of colors. FIG. 3E is a diagram showing an example of representative color information 306. Although in the present embodiment, a value stored in the ROM 210 is used for the predetermined number, this is not limitative. In determining the representative colors, for example, there can be used a method of determining the representative colors by selecting the predetermined number of colors from colors which are high in frequency in histograms of the RGB values.

In the present embodiment, the representative colors include a color used as the background color, and here, it is assumed that the predetermined number is determined to be four, and the representative colors are determined to be white, gray, red, and black, from the top of representative color information 306. Note that in the present embodiment, only the colors of characters are changed, and the colors of objects other than characters (in the case of the original image 300, a gray rectangle drawn in the lower portion) are not changed. For this reason, the representative colors include the color(s) of an object or objects other than the characters.

Figure 3G:
FIG. 3G is a view of an example of a character pixel color-converted image which is improved in color unevenness of a character in the reduced-color image.
Figure 3F:
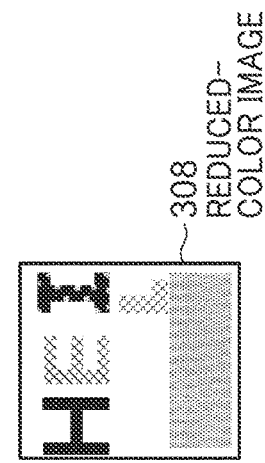
FIG. 3F is a view of an example of a reduced-color image.

The color reduction processor 307 performs color reduction processing on the original image 300 using the representative color information 306. In the present embodiment, the colors of all pixels in the original image 300 are each reduced to a color closest to each representative color. When the original image 300 shown in FIG. 3B is subjected to color reduction processing based on the above-mentioned representative colors, pink is converted to red, and as a result, a reduced-color image 308 as shown in FIG. 3F is generated. Note that color reduction processing is not limited to this example. Further, in a case where an original image has only the representative colors, color reduction processing is not performed, and the original image becomes a reduced-color image as it is.

The character pixel color conversion section 309 detects character pixels from the reduced-color image 308 using the edge detection signals 302, the variance value table 304, and the representative color information 306, and performs a color conversion process on the detected character pixels. By performing the character pixel color conversion process on the reduced-color image 308, a character pixel color-converted image 310 (hereinafter referred to as the "color-converted image 310) in which color unevenness of the character "I" on the upper right portion of the reduced-color image 308 is improved is generated, as shown in FIG. 3G. With this, it is possible to improve the compression efficiency in the binary image compression section 319, and further, it is possible to easily decode the image. Details of the character pixel color conversion process will be described hereinafter.

Figures 4A, 4B, 4C:
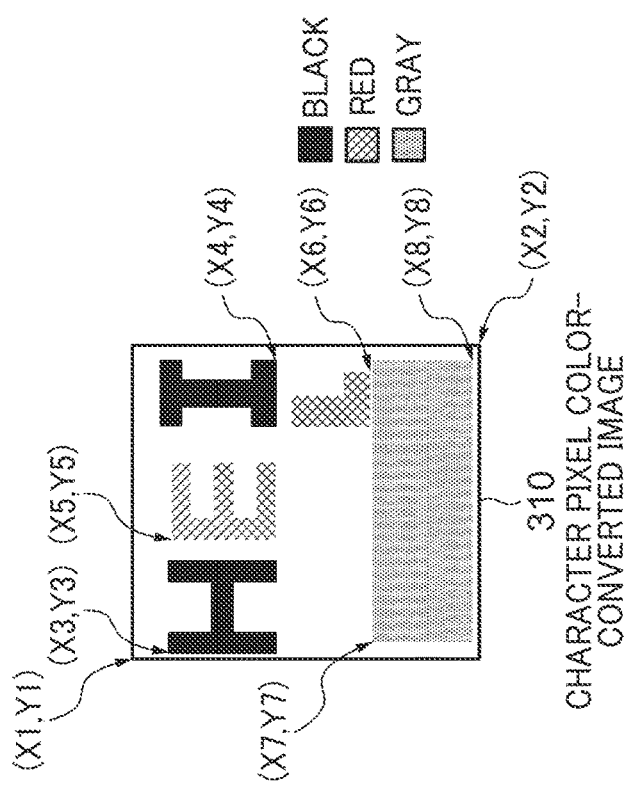
FIG. 4A is a schematic view useful in explaining processing executed by a color information generation section of the data processor.
FIG. 4B is a diagram showing color information generated by the color information generation section.
FIG. 4C is a diagram showing second color information obtained by sorting first color information.

The color information generation section 311 and the color information-sorting section 313 will be described with reference to FIGS. 4A to 4C. FIG. 4A is a schematic view useful in explaining processing executed by the color information generation section 311. FIG. 4A shows a state in which coordinates are set for the characters and the figure in the color-converted image 310 shown in FIG. 3G, on a color-by-color basis.

FIG. 4B is a diagram showing color information 312 generated by the color information generation section 311 (hereinafter referred to as the "first color information 312"). The color information generation section 311 generates the first color information 312 for the colors included in the color-converted image 310. Each of information items of the first color information 312 is formed by the number of pixels of a predetermined color, a value of the predetermined color, and a distribution range of the predetermined color in the whole image. The number of the information items of the first color information 312 corresponds to the number of the colors used in the color-converted image 310. Further, each distribution range is expressed by coordinates of a pixel at an upper-left corner (start coordinates) and coordinates of a pixel at a lower-right corner (end coordinates) of each color in the color-converted image 310.

The color information-sorting section 313 generates sorted color information 314 (hereinafter referred to as the "second color information 314") by sorting the first color information 312 based on the number of pixels for each color. FIG. 4C is a diagram showing the second color information 314 obtained by sorting the first color information 312. On the top of the second color information 314, information of a color which is largest in the number of pixels appears, and in this example, the number of white pixels is largest.

The background color data generation section 315 generates the value of a color included in the information on the top color in the second color information 314 as background color data 316 (indicated in FIG. 3A). Although in the present embodiment, a value of 8-bits is assumed for each color of RGB, this is not limitative.

Figure 5:
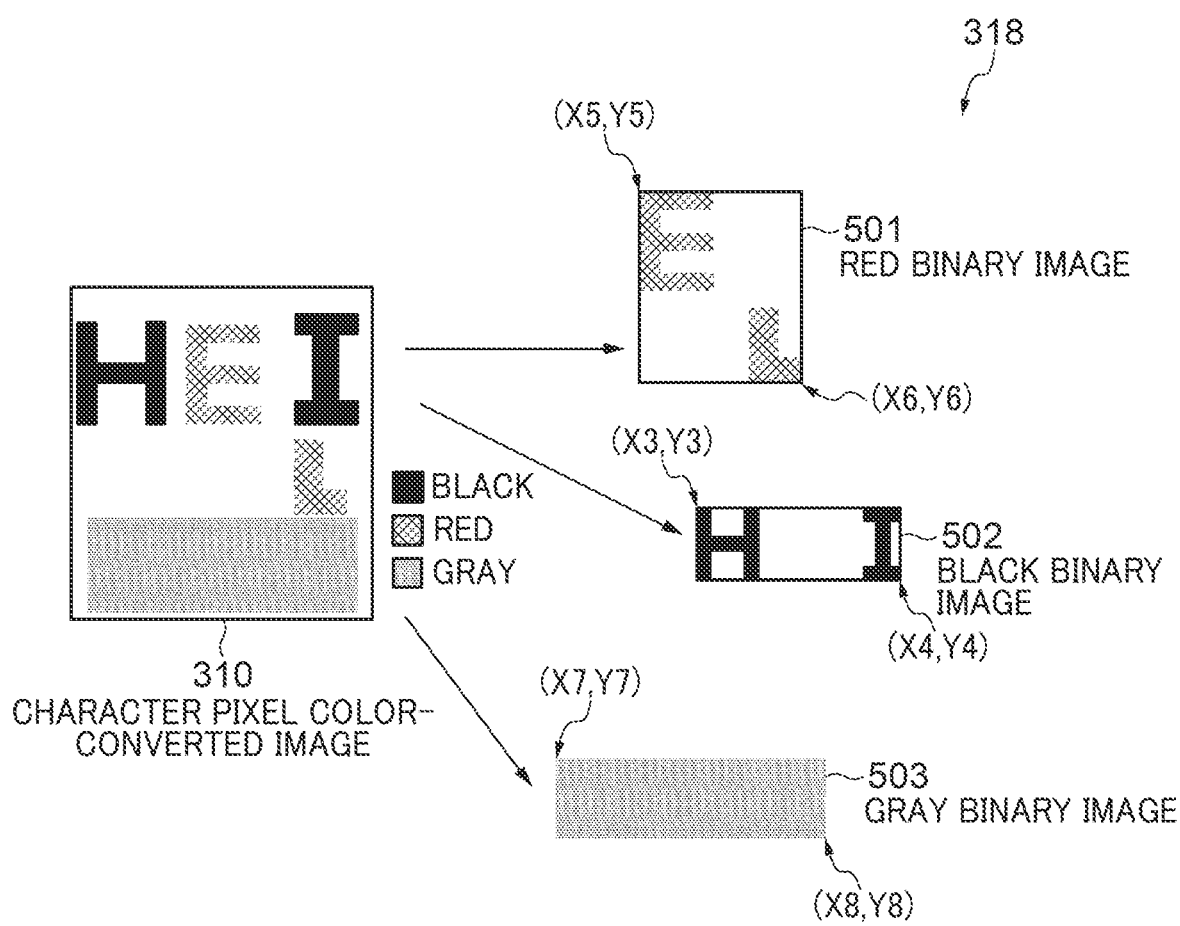
FIG. 5 is a diagram useful in explaining processing performed by a binary image generation section of the data processor.

The binary image generation section 317 will be described with reference to FIG. 5. FIG. 5 is a diagram useful in explaining processing performed by the binary image generation section 317. The binary image generation section 317 generates binary images 318 (indicated in FIG. 3A and appearing in FIG. 5) of respective colors based on the color-converted image 310 and the second color information 314. In the present embodiment, the binary images of the colors except the top color (white in the present embodiment) in the second color information 314 are generated. For example, in a case where a red binary image 501 as an example of one of the binary images 318 is generated, first, an image size is set which is define by coordinates of a pixel, which has red color information, at an upper-left corner in the color-converted image 310 as an upper-left vertex and coordinates of a pixel, which has the same color information, at a lower-right corner in the same image 310 as a lower-right vertex. Then, data indicative of red is added by setting each pixel having the same color as red to "1" and each pixel having a color which is not red to "0", whereby the red binary image 501 is generated. Similar operations are performed with respect to black and gray, whereby a black binary image 502 and a gray binary image 503 are generated.

The binary image compression section 319 compresses the binary image 318 generated for each color by the binary image generation section 317 to thereby generate binary image-compressed data 320 (indicated in FIG. 3A). Although in the present embodiment, the MMR compression method is used, a different compression method may be used. The binary image-compressed data 320 is a data group formed by the color information and the MMR-compressed data. The data integration section 321 integrates the background color data 316, the binary image-compressed data 320, and the second color information 314 to generate the compressed data 322.

Figure 6:
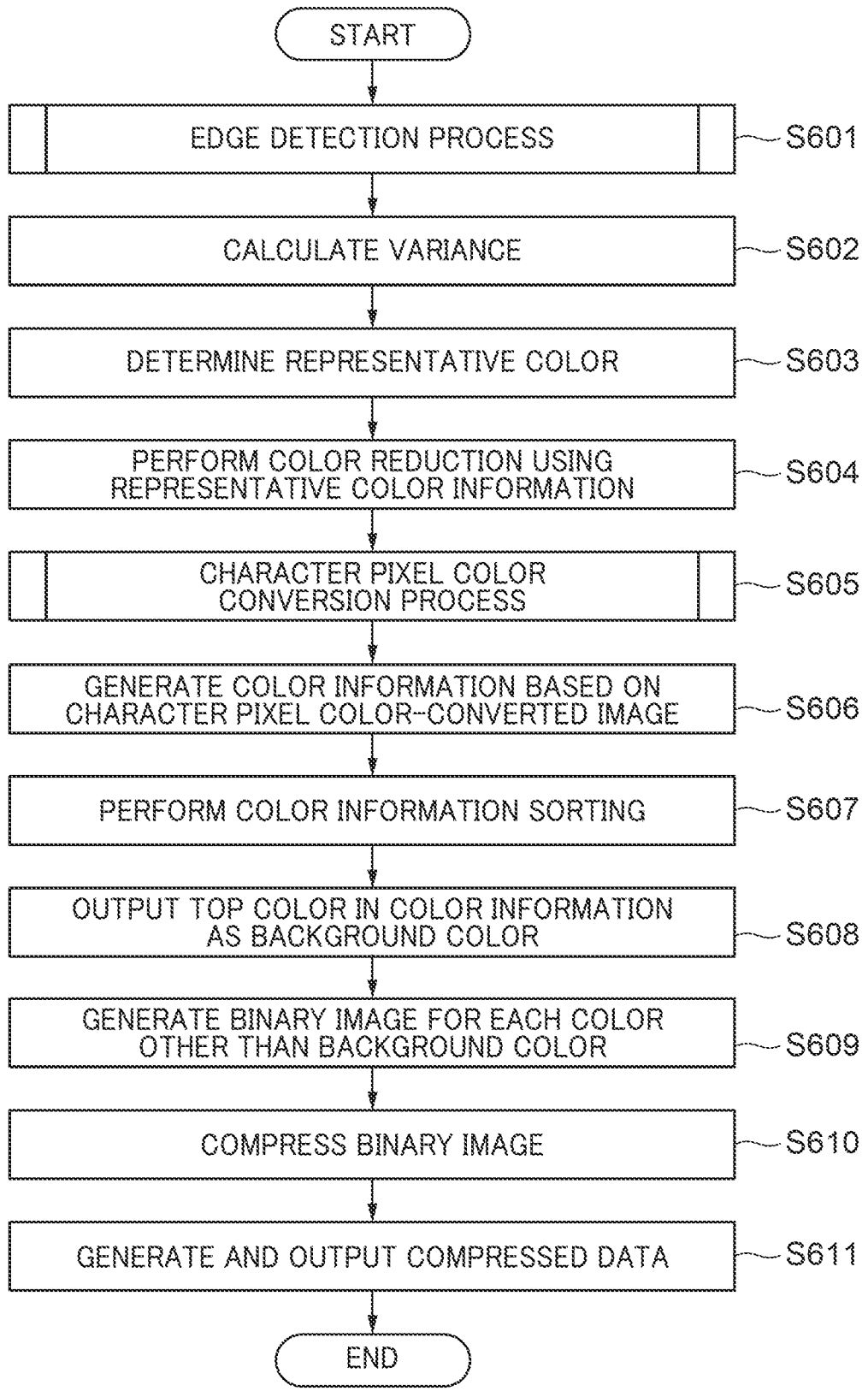
FIG. 6 is a flowchart of an image encoding process performed by the image processing apparatus (MFP) according to a first embodiment.

Next, an image encoding process performed by the MFP 101 configured as described above will be described with reference to FIG. 6. FIG. 6 is a flowchart of the image encoding process performed by the MFP 101. Processing steps denoted by respective S numbers (S601 to S611) in FIG. 6 are realized by the CPU 205 that loads a predetermined program stored in the storage section 211 into the RAM 206 and controls the operations of the components of the MFP 101. Processing in each of the steps S601 to S611 is executed by the data processor 215 under the control of the CPU 205.

First, processing performed before the start of the step S601 will be briefly described. When a user inputs a data format into which image data is to be encoded (compressed) is input from the console section 203 of the MFP 101, the input data format is notified to the CPU 205 via the console section interface 207. The CPU 205 instructs the scanner section 201 to read an original based on the notification received from the console section 203, and further, instructs the data processor 215 to start the process for encoding the image data of the original image 300 generated by the scanner section 201. Note that it is assumed here that the color reduction compression is designated as the method of encoding image data, and further, the original image 300 is a color image having a resolution of 300 pi and 8-bits for each color of RGB.

In response to the instruction for starting the process from the CPU 205, in the step S601, the edge detection section 301 of the data processor 215 performs the edge detection process on the original image 300 and generates the edge detection signals 302. Details of the edge detection process will be described hereinafter. In this step, as described with reference to FIG. 3C, the two types of edges, i.e. a strong edge and a weak edge which are different in strength are detected. For example, in an object having different densities, such as a handwritten character, both of strong edges each generated due to a difference between a character color and a background color and weak edges generated due to a difference between an intermediate color and the background color appear. This difference between the edges is used for determination of a pixel on which color conversion is to be performed in a process for converting the colors of character pixels, which will described hereinafter.

In the step S602, the variance calculation section 303 of the data processor 215 calculates variance of the original image 300 and generates the variance value table 304. Note that variance calculation is performed as described above, and further, since a known technique is used, detailed description thereof is omitted here.

In the step S603, the representative color determination section 305 of the data processor 215 generates the representative color information 306 based on the color information of the original image 300. Note that the representative color information 306 is generated as described above, and hence detailed description thereof is omitted here.

In the step S604, the color reduction processor 307 of the data processor 215 generates the reduced-color image 308 using the representative color information 306. The reduced-color image 308 is generated as described above, and hence detailed description thereof is omitted here.

In the step S605, the character pixel color conversion section 309 of the data processor 215 performs the character pixel color conversion process and generates the color-converted image 310. Note that the outline of the character pixel color conversion process is as described above, and more detailed description thereof will be given hereinafter. Further, the character pixel color conversion process in the step S605 is hereafter referred to as the character pixel color conversion process according to the first embodiment.

In a step S606, the color information generation section 311 of the data processor 215 generates the first color information 312 based on the color converted image 310. As described above, the first color information 312 is formed by data indicative of colors included in the color-converted image 310, and data indicative of the number of pixels of each reduced color, the coordinates of a pixel at the upper-left corner of the color-converted image 310, and the coordinates of a pixel at the lower-right corner of the same.

In the step S607, the color information-sorting section 313 of the data processor 215 sorts the first color information 312 according to the number of pixels of each color to generate the second color information 314. As a result, the color information of a color having the largest number of pixels becomes the top.

In the step S608, the background data generation section 315 of the data processor 215 outputs the value of the top color of the second color information 314 as the background color data 316 (indicated in FIG. 3A).

In the step S609, the binary image generation section 317 of the data processor 215 generates the binary image 318 for each color using the color information other than the top color and the color-converted image 310. Note that the binary image 318 for each color is generated as described above, and hence detailed description thereof is omitted here.

In the step S610, the binary image compression section 319 of the data processor 215 compresses the binary image 318 of each color using e.g. the MMR compression method to generate the binary image-compressed data 320. The binary image compressed data 320 generated in this step is formed by the color information and the MMR-compressed data.

In the step S611, the data integration section 321 of the data processor 215 generates the compressed data 322 from the background color data 316, the binary image-compressed data 320, and the second color information 314 and outputs the generated data. Note that an example of the format of the compressed data 322 will be described hereinafter. When the step S611 is terminated, the CPU 205 terminates the present process.

Next, the edge detection process in the step S601, the character pixel color conversion process according to the first embodiment in the step S605, and the data format of the compressed data 322 output in the step S611 will be described in detail.

Figure 7:
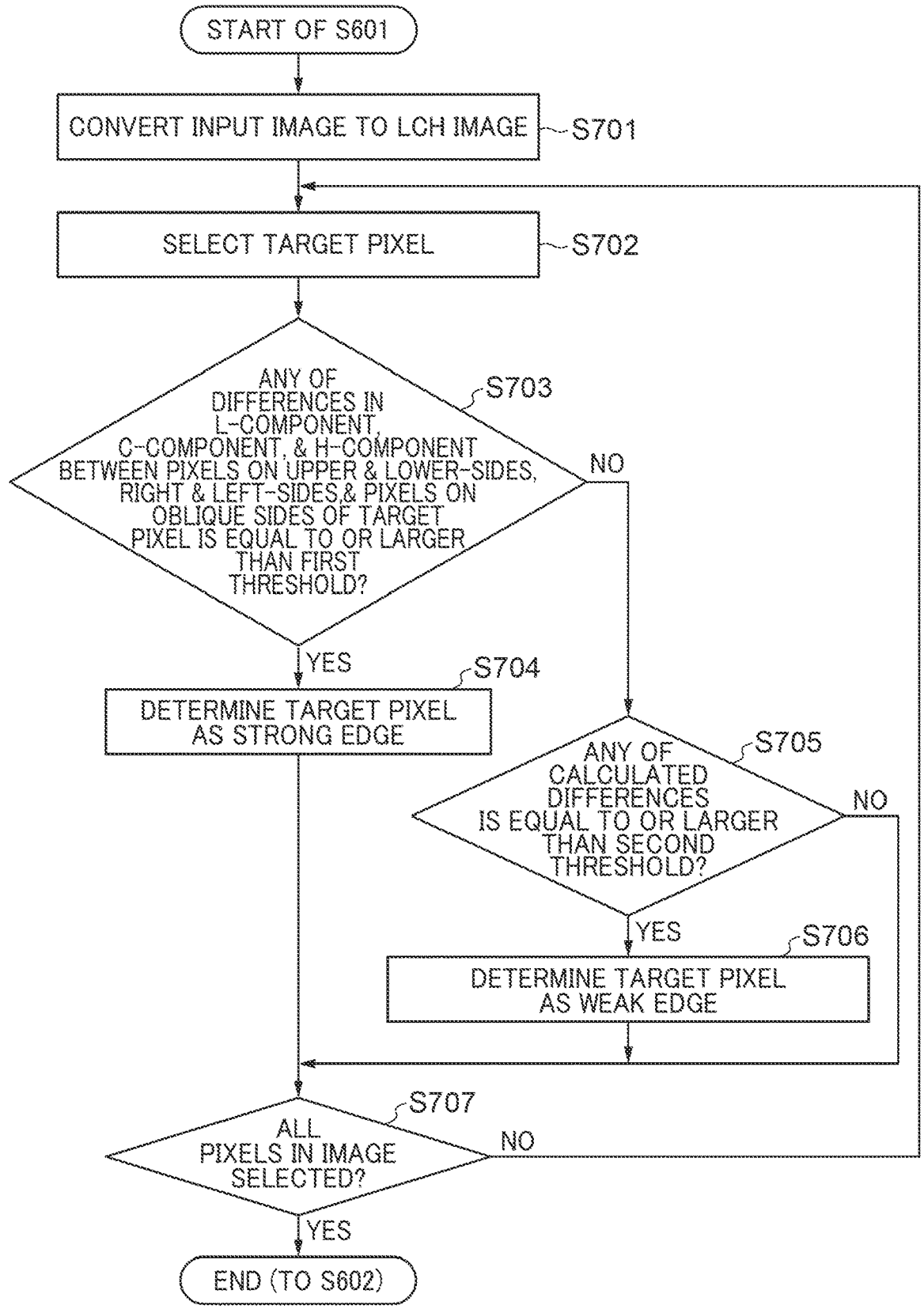
FIG. 7 is a flowchart of an edge detection process performed in a step in the image encoding process.

First, the edge detection process in the step S601 will be described. FIG. 7 is a flowchart of the edge detection process performed in the step S601.

In a step S701, the edge detection section 301 converts the original image 300 to an image of the LCH color space expressed by luminance and color difference components. A known formula can be used for conversion, and hence detailed description thereof is omitted here. Note that although in the present embodiment, the original image 300 is converted to an image in which each of LCH components (luminance (L), chroma (C), and hue (H)) is represented by an 8-bit value, the image is only required to be converted to an image of a color space expressed by luminance and color difference components, and hence the original image 300 may be converted to e.g. an image of. the L*a*b* color space or the YCbCr color space.

In a step S702, the edge detection section 301 selects one pixel from the pixels in the original image 300 as a target pixel. Target pixels may be each selected from the pixels in the original image 300 in any order, and in the present embodiment, the target pixels are each selected in an order of raster scan of the whole image.

In a step S703, the edge detection section 301 calculates a difference in each of LCH components between pixels located on upper and lower sides of the target pixel, pixels located on right and left sides of the target pixel, and pixels located obliquely to the target pixel, and determines whether or not at least one of the calculated differences is equal to or larger than a first threshold value determined in advance. More specifically, the edge detection section 301 calculates a difference in each of the LCH components between a pixel located on the upper side and a pixel on the lower side of the target pixel and determines whether or not any of the differences in the respective components is equal to or larger than the first threshold value. Similarly, the edge detection section 301 calculates a difference in each of the LCH components between a pixel located on the left side of the target pixel and a pixel located on the right side of the target pixel, further, between a pixel located right-obliquely upward of the target pixel and a pixel located left-obliquely downward of the target pixel, and between a pixel located left-obliquely upward of the target pixel and a pixel located right-obliquely downward of the target pixel, and determines whether or not any of the differences in the components is equal to or larger than the first threshold value. Note that in this step, differences in the three components in the four directions, i.e. a total of 12 differences are calculated.

If it is determined that at least one of the 12 differences is equal to or larger than the first threshold value (YES to the step S703), the edge detection section 301 executes a step S704, whereas if it is determined that all of the 12 differences are smaller than the first threshold value (NO to the step S703), the edge detection section 301 executes a step S705.

In the step S704, the edge detection section 301 determines that the target pixel is a strong edge, and then executes a step S707.

In the step S705, the edge detection section 301 determines whether or not at least one of the 12 differences calculated in the step S703 is equal to or larger than a second threshold value determined in advance. The second threshold value is a value smaller than the first threshold value, and for example, in a case where the first threshold value is set to 50, the second threshold value can be set to 40. If it is determined that at least one of the 12 differences is equal to or larger than the second threshold value (YES to the step S705), the edge detection section 301 executes a step S706, whereas if it is determined that all of the 12 differences are smaller than the second threshold value (NO to the step S705), the edge detection section 301 executes the step S707.

In the step S706, the edge detection section 301 determines that the target pixel is a weak edge and then executes the step S707.

In the step S707, the edge detection section 301 determines whether or not all of the pixels in the image have been selected as a target pixel. If it is determined that all of the pixels have been selected as a target pixel (YES to the step S707), the edge detection section 301 terminates the present process, whereas if it is determined that all of the pixels have not been selected as a target pixel (NO to the step S707), the edge detection section 301 executes the step S702. When the process in FIG. 7 is terminated, the step S602 in FIG. 6 is executed.

Next, the character pixel color conversion process according to the first embodiment in the step S605 will be described. FIG. 8A is a diagram showing an example of the reduced-color image 308 obtained as a result of the process up to the processing executed by the color reduction processor 307. FIG. 8B is an enlarged view of an area 804 as a portion of a handwritten character 801 in the reduced-color image 308. Note that the reduced-color image 308 shown in FIG. 8A is the same as the reduced-color image 308 shown in FIG. 3F.

For example, in a case where the original image 300 is generated by scanning an original including a character having density unevenness, such as a handwritten character, a pixel, such a pixel 802 appearing in FIG. 8B, is sometimes generated whose color is reduced to an intermediate color between the color of the pixels forming the handwritten character 801 and the color of a background 803. If such a pixel exists, when the binary image compression section 319 generates a binary image for each color, the continuity of the pixels forming the character is lowered. As a result, in the MMR compression method or the like in which the compression ratio increases as the continuity of pixels is higher, the compression efficiency is markedly lowered.

To avoid this problem, in the present embodiment, the color of the handwritten character 801 in the reduced-color image 308 is changed based on the representative color information 306, whereby it is made possible to reproduce the image information (information included in the original image 300) without omission and improve the compression efficiently.

Figure 9:
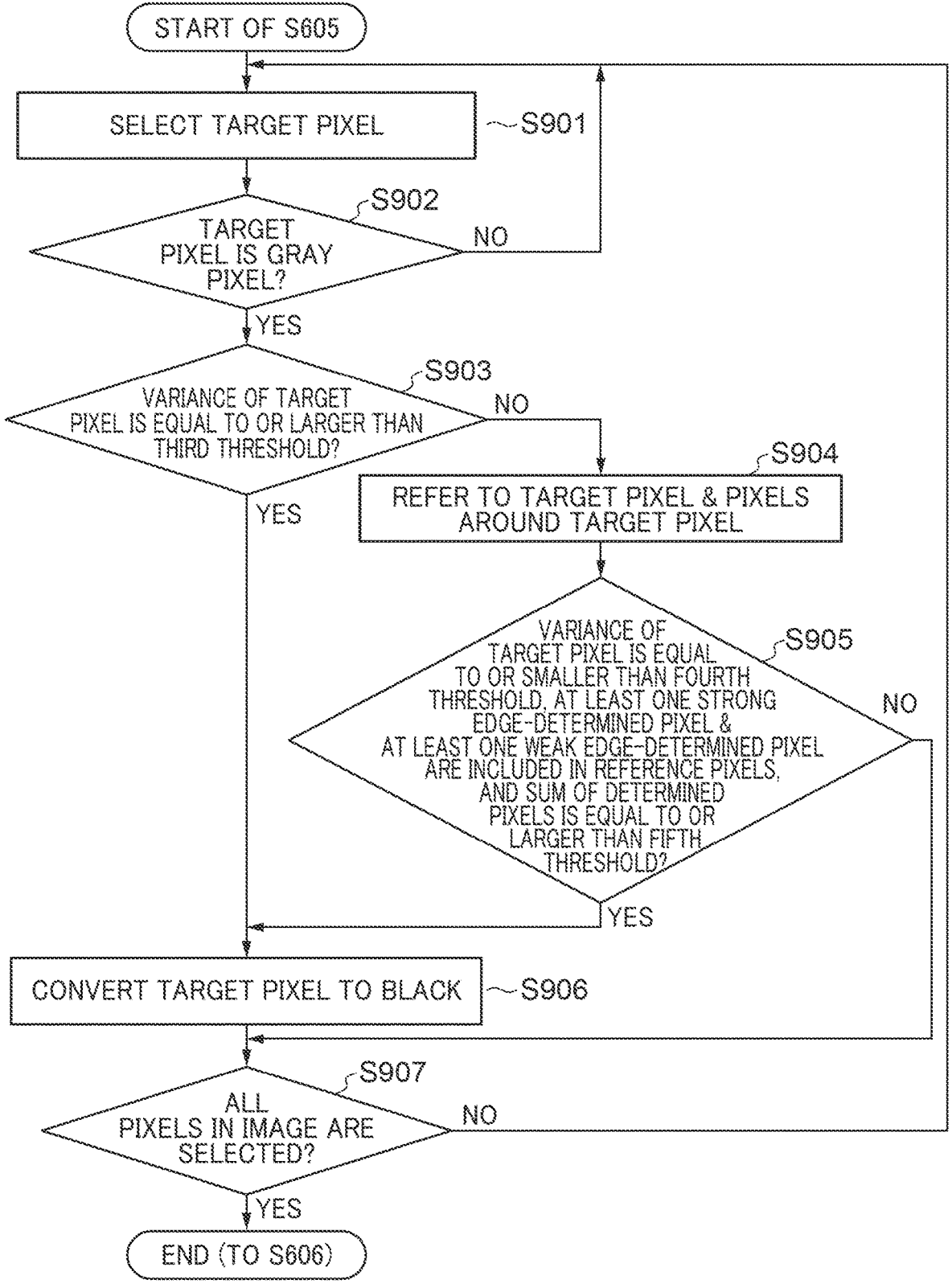
FIG. 9 is a flowchart of a character pixel color conversion process performed by a character pixel color conversion section of the data processor.

FIG. 9 is a flowchart of the character pixel color conversion process according to the first embodiment, which is performed in the step S605. In a step S901, the character pixel color conversion section 309 selects one pixel from the pixels in the reduced-color image 308 as a target pixel. Target pixels may be each selected from the pixels in the reduced-color image 308 in any order, and in the present embodiment, the target pixels are each selected in an order of raster scan of the whole image.

In a step S902, the character pixel color conversion section 309 determines based on the representative color information 306 whether or not the target pixel is a gray pixel. More specifically, it is determined whether or not, among colors each of which is included in the representative color information 306 and has a difference of 5 or less between respective luminance values of the RGB components, the color of the target pixel is a color other than a color having the highest luminance value and a color having the lowest luminance value. For example, in the representative color information 306 shown in FIG. 8C, the color having the highest luminance value is (255, 255, 255), and the color having the lowest luminance value is (0, 0, 0). Therefore, the color which is other than these colors and has a difference of 5 or less between the respective luminance values of the RGB components is (128, 128, 128), and a pixel whose color is reduced to this color is determined as a gray pixel. Note that the method of determining a gray pixel is not limited to this, but for example, the gray pixel may be determined e.g. based on values of a C component and a H component of a color space which can be expressed by luminance and hue components, such as the LCH color space.

If it is determined that the target pixel is a gray pixel (YES to the step S902), the character pixel color conversion section 309 executes a step S903, whereas if it is determined that the target pixel is not a gray pixel (NO to the step S902), the character pixel color conversion section 309 executes the step S901.

In the step S903, the character pixel color conversion section 309 determines based on the variance value table 304 whether or not the variance of the target pixel is equal to or larger than a third threshold value determined in advance. For example, in the variance value table 304 shown in FIG. 8D, when the coordinates of the target pixel is (X4, Y1), the variance of the target pixel is 50, and in a case where the third threshold value is set to 80, it is determined that the variance of the target pixel is smaller than the third threshold value. Note that the value of the third threshold value is not limited to this.

If it is determined in the step S903 that the variance of the target pixel is equal to or larger than the third threshold value (YES to the step S903), the character pixel color conversion section 309 executes a step S906, whereas if it is determined that the variance of the target pixel is smaller than the third threshold value (NO to the step S903), the character pixel color conversion section 309 executes a step S904. In the step S904, the character pixel color conversion section 309 selects 49 pixels surrounding the target pixel in the center, which are formed by 7 pixels in the vertical direction×7 pixels in the lateral direction, as reference pixels. Note that the number of reference pixels is not limited to this.

In a step S905, the character pixel color conversion section 309 determines whether or not the following first to third conditions are all satisfied: The first condition is that the variance of the target pixel is equal to or smaller than a fourth threshold value. The second condition is that the reference pixels selected in the step S904 include one or more pixels determined as a strong edge (strong edge-determined pixels) and one or more pixels determined as a weak edge (weak edge-determined pixels). The third condition is that in a case where the second condition is satisfied, the sum of the number of strong edge-determined pixels and the number of weak edge-determined pixels is equal to or larger than a fifth threshold value.

FIG. 8E is a view of an example of a result of edge detection performed on pixels appearing in FIG. 8B. The number of pixels determined as an edge (edge-determined pixels) out of the reference pixels around the target pixel is calculated, and it is determined whether or not the target pixel is a pixel located inside the pixels of the character having density unevenness. In the illustrated example in FIG. 8E, the 13 strong edge-determined pixels, and the 9 weak edge-determined pixels are included, and therefore, the sum of the edge-determined pixels is 22. For example, in a case where the fourth threshold value is set to 80, and the fifth threshold value is set to 15, all of the conditions are satisfied. Note that the fourth threshold value is only required to be equal to or smaller than the third threshold value and is not limited to the above-mentioned value. Further, the fifth threshold value is not limited to the above-mentioned value, either.

If it is determined that the first to third conditions are all satisfied (YES to the step S905), the character pixel color conversion section 309 executes the step S906, whereas if it is determined that at least one of the first to third conditions is not satisfied (NO to the step S905), the character pixel color conversion section 309 executes a step S907. Note that in a case where the answer to the question of the step S903 becomes affirmative (YES), this means that the character pixel color conversion section 309 determines that the target pixel is a pixel existing within the character having density unevenness.

In the step S906, the character pixel color conversion section 309 converts the target pixel to black. For example, among the colors included in the representative color information 306, a color which has a difference of 5 or less between respective luminance values of the RGB components and has the lowest luminance value is determined as a black pixel. In the illustrated example in FIG. 8C, a pixel at (0, 0, 0) is a black pixel.

In the step S907, the character pixel color conversion section 309 determines whether or not all of the pixels in the reduced-color image 308 have been selected as a target pixel. If it is determined that all of the pixels have been selected as a target pixel (YES to the step S907), the character pixel color conversion section 309 terminates the present process, whereas if it is determined that all of the pixels has not been selected as a target pixel (NO to the step S907), the character pixel color conversion section 309 executes the step S901. When the process in FIG. 9 is terminated, the step S606 in FIG. 6 is executed.

Figure 10:
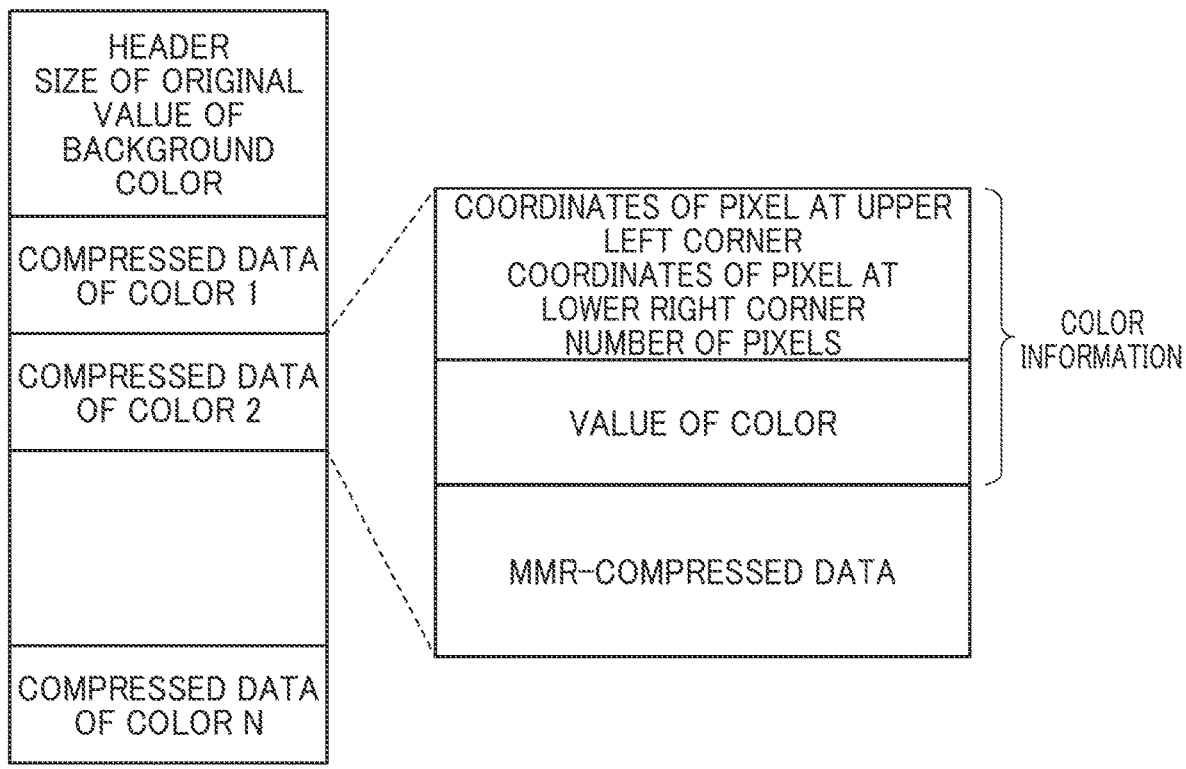
FIG. 10 is a diagram showing an example of the format of compressed data output in a step in the image encoding process.

Next, the format of the compressed data 322 output in the step S611 will be described. FIG. 10 is a diagram showing an example of the format of the compressed data 322 output in the step S611. The compressed data 322 is formed by a header part and a compressed data part of each color.

The header part includes information on the size (the number of pixels in the vertical and lateral directions) of the original image 300 obtained by scanning an original, a value of the background color, a resolution, and so forth. As the background color, basically, a color having the largest number of pixels is selected. For example, in a case where the original image 300 is generated from an original formed by drawing characters, a figure, and so forth, on a red color sheet, and hence it is determined that the background color is red, a value of red is input to the value of the background color.

The compressed data part of each color is formed by color information and MMR-compressed data. In a case where the number of colors left after excluding the background color is "N", the compressed data part is formed by a corresponding number N of data items having the same structure. Therefore, for example, in a case where the original image 300 is a single color document, such as white paper, the compressed data part of this color is not generated. Further, in a case where an original of the original image 300 is a black-and-white document, the number of color compressed data is "1" and is equivalent to the binary image. In a case where the black pixels form only part of the original, only this part is compressed as the MMR-compressed data, and hence the MMR-compressed data has a data size smaller than in a case where the whole original image of the black-and-white document is MMR-compressed.

Decoding of the compressed data 322 is performed as described in the following: First, the whole area of the original is drawn with the background color stored in the header part. Then, the MMR-compressed data included in the compressed data part is expanded in a storing order and overwritten according to the stored position and color, by masking the obtained image. With this, a decoded image is obtained.

As described above, according to the present embodiment, by correcting only the color of pixels determined as belonging to a character, it is possible to reproduce the image information without omission and improve the compression efficiency.

Figure 11A:
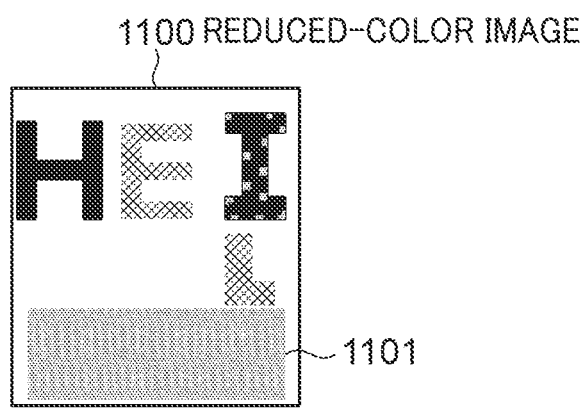
FIG. 11A is a view of an example of a reduced-color image having noise pixels, which is obtained after termination of processing performed by the color reduction processor.
Figure 11B:
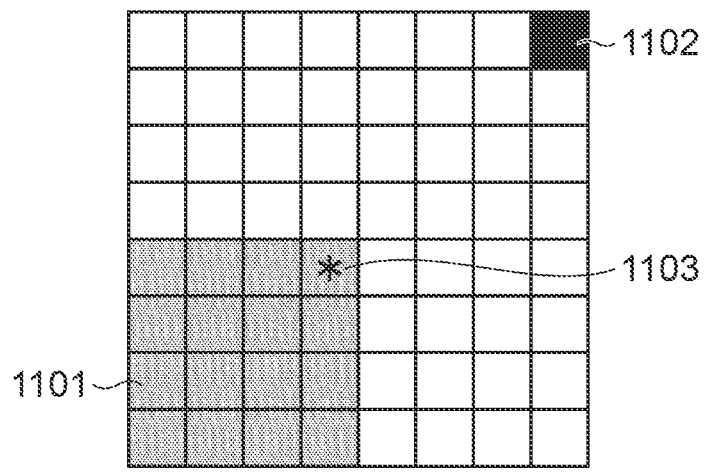
FIG. 11B is an enlarged view of an upper right portion of a gray object in the reduced-color image shown in FIG. 11A.

Next, the character pixel color conversion process according to a second embodiment, which is performed by the character pixel color conversion section 309, will be described. FIG. 11A is a view of an example of a 2-bit image 1100 obtained after the processing performed by the color reduction processor 307 is terminated. FIG. 11B is an enlarged diagram of an upper right portion of a gray object 1101 in the reduced-color image 1100 shown in FIG. 11A. The reduced-color image 1100 differs from the reduced-color image 308 shown in FIG. 3F in that a noise pixel 1102 having a color different from the color of the gray object 1101 is generated in the vicinity of the upper right portion of the gray object 1101. The noise pixel 1102 is generated e.g. due to dust attached to an original or an original platen glass when the original is read by the scanner section 201.

In the character pixel color conversion process according to the first embodiment in the step S605, a pixel 1103, which is close to the noise pixel 1102, in the gray object 1101 is not a character pixel, but is converted to black because a strong edge pixel near the noise pixel 1102 is referred to. With this, the original information of the original is missed.

Figure 12:
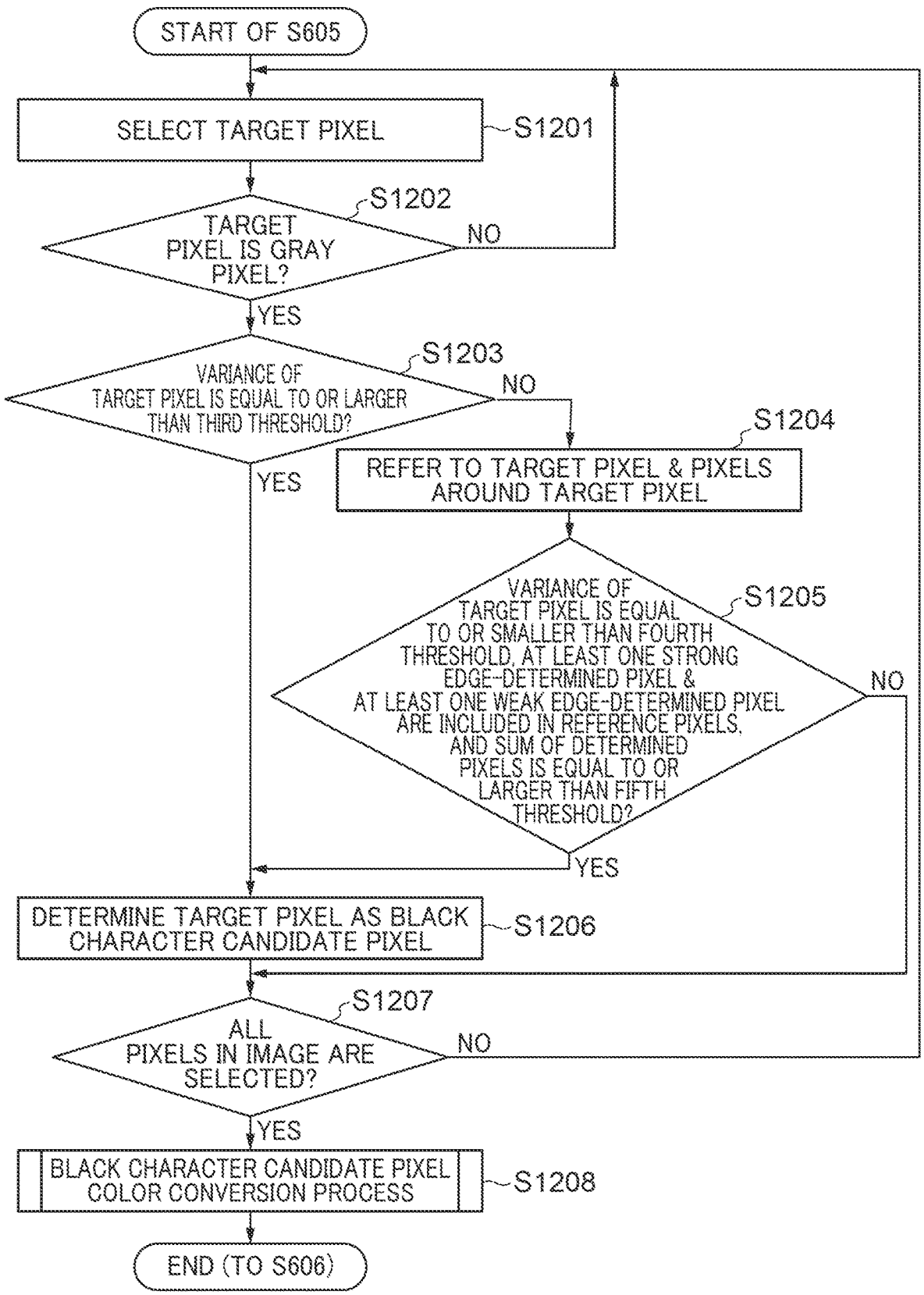
FIG. 12 is a flowchart of a character pixel color conversion process performed by the character pixel color conversion section of the data processor of the image processing apparatus (MFP) according to a second embodiment.

FIG. 12 is a flowchart of the character pixel color conversion process according to the second embodiment, which is performed to solve this problem. The character pixel color conversion process according to the second embodiment is used in place of the character pixel color conversion process according to the first embodiment. That is, the whole process for generating the compressed data of the original image 300 is performed according to the flowchart in FIG. 6, and the flowchart in FIG. 9 explaining the step S605 is replaced by the flowchart in FIG. 12. Therefore, steps S1201 to S1208 are executed by the character pixel color conversion section 309 of the data processor 215 under the control of the CPU 205.

The steps S1201 to S1205 are the same as the steps S901 to S905 in FIG. 9, and hence description thereof is omitted here. It is assumed for convenience of explanation that the pixel 1103 (pixel closest to the noise pixel 1102 in the gray object 1101) appearing in FIG. 11B has been selected as a target pixel, and as a result of the determination in the step S1205 (YES to the step S1205), the step S1206 is executed.

Figure 11C:
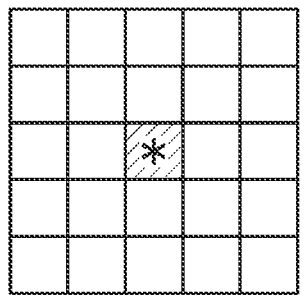
FIG. 11C is a schematic view showing a state in which a target pixel is determined as a black character candidate pixel.

In the step S1206, the character pixel color conversion section 309 determines the target pixel as a black character candidate pixel. FIG. 11C is a schematic view showing a state in which the target pixel is determined as a black character candidate pixel. Note that a pixel which is not determined as a black character candidate pixel is referred to as the non-black character candidate pixel.

The step S1207 is the same as the step S907 in FIG. 9, and hence description thereof is omitted here. If it is determined that all of the pixels have not been selected as a target pixel (NO to the step S1207), the character pixel color conversion section 309 executes the step S1201, whereas if it is determined that all of the pixels have been selected as a target pixel (YES to the step S1207), the character pixel color conversion section 309 executes the step S1208.

In the step S1208, the character pixel color conversion section 309 executes a black character candidate pixel color conversion process. Details of the process in the step S1208 will be described hereinafter. When the process in the step S1208 is terminated, the character pixel color conversion section 309 terminates the present process, whereafter the step S606 in FIG. 6 is executed by the data processor 215.

Figure 13:
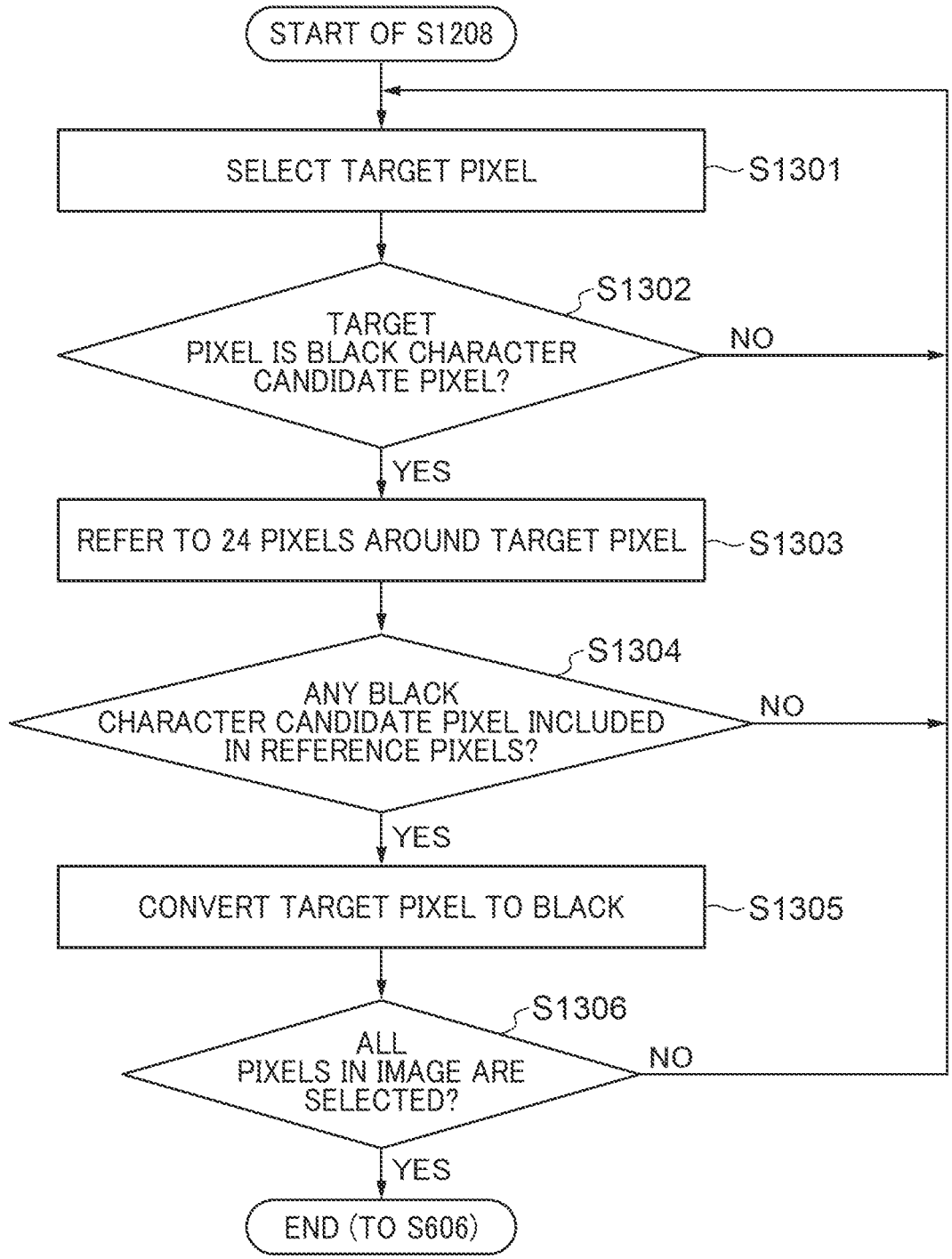
FIG. 13 is a flowchart of a black character candidate pixel color conversion process performed in a step in the character pixel color conversion process in FIG. 12.

FIG. 13 is a flowchart of the black character candidate pixel color conversion process in the step S1208. In a step S1301, the character pixel color conversion section 309 selects one pixel from the pixels in the reduced-color image 308 as a target pixel. Target pixels may be each selected from the pixels in the reduced-color image 308 in any order, and in the present embodiment, the target pixels are each selected in an order of raster scan of the whole image.

When the step S1301 is started, the determination of whether or not a pixel is a black character candidate pixel has already been performed with respect to all of the pixels in the reduced-color image 308. Therefore, in a step S1302, the character pixel color conversion section 309 determines whether or not the target pixel is a black character candidate pixel. If it is determined that the target pixel is a black character candidate pixel (YES to the step S1302), the character pixel color conversion section 309 executes a step S1303, whereas if it is determined that the target pixel is a non-black character candidate pixel (NO to the step S1302), the character pixel color conversion section 309 returns to the step S1301.

In the step S1303, the character pixel color conversion section 309 selects 24 pixels, except the target pixel, surrounding the target pixel in the center, which are formed by 5 pixels in the vertical direction×5 pixels in the lateral direction, as reference pixels. Note that the number of reference pixels is not limited to this.

In a step S1304, the character pixel color conversion section 309 determines whether or not any black character candidate pixel is included in the reference pixels selected in the step S1303. If it is determined that any black character candidate pixel is included in the reference pixels (YES to the step S1304), the character pixel color conversion section 309 executes a step S1305, whereas if it is determined that no black character candidate pixel is included in the reference pixels (NO to the step S1304), the character pixel color conversion section 309 returns to the step S1301.

In the step S1305, the character pixel color conversion section 309 converts the color of the target pixel to black. The conversion method is the same as that used in the step S906, and hence description thereof is omitted here.

In a step S1306, the character pixel color conversion section 309 determines whether or not all of the pixels in the reduced-color image 308 have been selected as a target pixel. If it is determined that all of the pixels have been selected as a target pixel (YES to the step S1306), the character pixel color conversion section 309 terminates the present process, whereas if it is determined that all of the pixels has not been selected as a target pixel (NO to the step S1306), the character pixel color conversion section 309 returns to the step S1301. When the process in FIG. 13 is terminated, the process in FIG. 12 is terminated at the same time, and therefore, the step S606 in FIG. 6 is executed thereafter.

As described above, by employing the character pixel color conversion process according to the second embodiment, it is possible to obtain the same advantageous effects as provided by the first embodiment, and further, it is possible to suppress erroneous conversion of a color of a pixel in a case where a noise pixel is included.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-013253 filed Jan. 31, 2022, which is hereby incorporated by reference herein in its entirety.

What is claimed is:

1. An image processing apparatus comprising:
a detection unit configured to detect character pixels from an image generated by reading an original using a scanner, the detected character pixels representing characters in the image generated by reading the original;
a determination unit configured to determine color information for use in compressing image data;
a color conversion unit configured to generate a color-converted image in which colors of the character pixels detected by the detection unit are corrected based on the color information, without changing colors of pixels other than the colors of the character pixels detected by the detection unit, such that a first character in the image generated by reading the original includes first character pixels having a first color and second character pixels having a second color different from the first color, and the character pixels in the first character that have the second color are corrected to have the first color so that the first character in the color-converted image includes pixels having the first color only;
a division unit configured to divide the color-converted image into character images of respective colors of the color information; and
a compression unit configured to generate compressed data of binary images from the character images of the respective colors,
wherein to generate the color-converted image including the first character including pixels having the first color only, the color conversion unit is configured to: (i) select a target pixel, (ii) determine whether a color of the target pixel is the second color, (iii) in a case where it is determined that the color of the target pixel is the second color, determine whether a variance value of the target pixel having the second color is equal to or larger than a third threshold, and (iv) in a case where the variance value of the target pixel having the second color is equal to or larger than the third threshold, correct the color of the target pixel having the second color to have the first color, and wherein the color conversion unit is further configured to:
(v) in a case where the variance value of the target pixel having the second color is less than the third threshold, select a plurality of pixels surrounding the target pixel, with the target pixel being disposed at a center of the plurality of pixels, (vi.a) determine whether the variance value of the target pixel having the second color is equal to or larger than a fourth threshold, (vi.b) determine whether one or more pixels among the plurality of pixels surrounding the target pixel is a strong edge pixel and whether one or more pixels among the plurality of pixels surrounding the target pixel is a weak edge pixel, and (vi.c) in a case where it is determined that the plurality of pixels surrounding the target pixel include one or more strong edge pixels and one or more weak edge pixels, determine whether a sum of a number of the strong edge pixels and a number of the weak edge pixels is equal to or larger than a fifth threshold.

2. The image processing apparatus according to claim 1, wherein the color conversion unit converts other colors of character pixels than colors included in the color information to ones, closest to the other colors, of the colors included in the color information.

3. The image processing apparatus according to claim 1, further comprising:
a calculation unit configured to calculate variance of a luminance value of each pixel in the image, and
an edge detection unit configured to detect edge information on each pixel in the image, and
wherein the detection unit detects each character pixel based on the variance and the edge information.

4. The image processing apparatus according to claim 3, wherein the color conversion unit generates the color-converted image based on the variance, the edge information, and the colors of the color information.

5. The image processing apparatus according to claim 1, further comprising a color reduction unit configured to generate a reduced-color image by reducing colors of an image generated by the scanner, based on the color information, and
wherein the color conversion unit generates the color-converted image from the reduced-color image.

6. The image processing apparatus according to claim 5, wherein the color conversion unit corrects a color of a pixel of the reduced-color image based on information on pixels around the pixel.

7. The image processing apparatus according to claim 1, wherein the color conversion unit is further configured to (vii) in a case where it is determined that the sum of the number of the strong edge pixels and the number of the weak edge pixels is equal to or larger than the fifth threshold, correct the color of the target pixel having the second color and being disposed at the center of the plurality of pixels to have the first color.

8. The image processing apparatus according to claim 7, wherein the color conversion unit is further configured to not correct the color of the target pixel having the second color in a case where: the variance value of the target pixel having the second color is less than the fourth threshold, the plurality of pixels surrounding the target pixel do not include the strong edge pixel or the weak edge pixel, or the sum of the number of the strong edge pixels and the number of the weak edge pixels is less than the fifth threshold.

9. The image processing apparatus according to claim 1, wherein the variance value of the target pixel is a variance of luminance values of a plurality of pixels included in an area surrounding the target pixel, the target pixel being disposed at a center of the area.

10. A method of controlling an image processing apparatus, comprising:
detecting character pixels from an image generated by reading an original using a scanner, the detected character pixels representing characters in the image generated by reading the original;
determining color information for use in compressing image data;
generating a color-converted image in which colors of the detected character pixels are corrected based on the color information, without changing colors of pixels other than the colors of the detected character pixels, such that a first character in the image generated by reading the original includes first character pixels having a first color and second character pixels having a second color different from the first color, and the character pixels in the first character that have the second color are corrected to have the first color so that the first character in the color-converted image includes pixels having the first color only;
dividing the color-converted image into character images of respective colors of the color information; and
generating compressed data of binary images from the character images of the respective colors,
wherein to generate the color-converted image including the first character including pixels having the first color only, the generating the color-converted image includes: (i) selecting a target pixel, (ii) determining whether a color of the target pixel is the second color, (iii) in a case where it is determined that the color of the target pixel is the second color, determining whether a variance value of the target pixel having the second color is equal to or larger than a third threshold, and (iv) in a case where the variance value of the target pixel having the second color is equal to or larger than the third threshold, correcting the color of the target pixel having the second color to have the first color, and
wherein the generating the color-converted image further includes: (v) in a case where the variance value of the target pixel having the second color is less than the third threshold, selecting a plurality of pixels surrounding the target pixel, with the target pixel being disposed at a center of the plurality of pixels, (vi.a) determining whether the variance value of the target pixel having the second color is equal to or larger than a fourth threshold, (vi.b) determining whether one or more pixels among the plurality of pixels surrounding the target pixel is a strong edge pixel and whether one or more pixels among the plurality of pixels surrounding the target pixel is a weak edge pixel, and (vi.c) in a case where it is determined that the plurality of pixels surrounding the target pixel include one or more strong edge pixels and one or more weak edge pixels, determining whether a sum of a number of the strong edge pixels and a number of the weak edge pixels is equal to or larger than a fifth threshold.

11. A non-transitory computer-readable storage medium storing a program for causing a computer to execute a method of controlling an image processing apparatus,
wherein the method comprises:
detecting character pixels from an image generated by reading an original using a scanner, the detected character pixels representing characters in the image generated by reading the original;

determining color information for use in compressing image data;

generating a color-converted image in which colors of the detected character pixels are corrected based on the color information, without changing colors of pixels other than the colors of the detected character pixels, such that a first character in the image generated by reading the original includes first character pixels having a first color and second character pixels having a second color different from the first color, and the character pixels in the first character that have the second color are corrected to have the first color so that the first character in the color-converted image includes pixels having the first color only;

dividing the color-converted image into character images of respective colors of the color information; and generating compressed data of binary images from the character images of the respective colors, wherein to generate the color-converted image including the first character including pixels having the first color only, the generating the color-converted image includes: (i) selecting a target pixel, (ii) determining whether a color of the target pixel is the second color, (iii) in a case where it is determined that the color of the target pixel is the second color, determining whether a variance value of the target pixel having the second color is equal to or larger than a third threshold, and (iv) in a case where the variance value of the target pixel having the second color is equal to or larger than the third threshold, correcting the color of the target pixel having the second color to have the first color, and wherein the generating the color-converted image further includes: (v) in a case where the variance value of the target pixel having the second color is less than the third threshold, selecting a plurality of pixels surrounding the target pixel, with the target pixel being disposed at a center of the plurality of pixels, (vi.a) determining whether the variance value of the target pixel having the second color is equal to or larger than a fourth threshold, (vi.b) determining whether one or more pixels among the plurality of pixels surrounding the target pixel is a strong edge pixel and whether one or more pixels among the plurality of pixels surrounding the target pixel is a weak edge pixel, and (vi.c) in a case where it is determined that the plurality of pixels surrounding the target pixel include one or more strong edge pixels and one or more weak edge pixels, determining whether a sum of a number of the strong edge pixels and a number of the weak edge pixels is equal to or larger than a fifth threshold.

\* \* \* \* \*